(12) United States Patent
Pendergrass

(10) Patent No.: US 10,122,794 B2
(45) Date of Patent: Nov. 6, 2018

(54) STORING DATA AT A REMOTE LOCATION BASED ON PREDETERMINED CRITERIA

(71) Applicant: HEWLETT PACKARD ENTERPRISE DEVELOPMENT LP, Houston, TX (US)

(72) Inventor: Eric Addkison Pendergrass, Ft. Collins, CO (US)

(73) Assignee: Hewlett Packard Enterprise Development LP, Houston, TX (US)

( * ) Notice: Subject to any disclaimer, the term of this patent is extended or adjusted under 35 U.S.C. 154(b) by 202 days.

(21) Appl. No.: 15/024,377

(22) PCT Filed: Oct. 17, 2013

(86) PCT No.: PCT/US2013/065434
§ 371 (c)(1),
(2) Date: Mar. 24, 2016

(87) PCT Pub. No.: WO2015/057229
PCT Pub. Date: Apr. 23, 2015

(65) Prior Publication Data
US 2016/0241644 A1    Aug. 18, 2016

(51) Int. Cl.
*G06F 15/16* (2006.01)
*H04L 29/08* (2006.01)
*G06F 17/30* (2006.01)
*G06F 21/62* (2013.01)
*H04L 29/06* (2006.01)

(52) U.S. Cl.
CPC .... *H04L 67/1097* (2013.01); *G06F 17/30082* (2013.01); *G06F 21/6272* (2013.01); *H04L 67/18* (2013.01); *H04L 67/32* (2013.01); *H04L 69/28* (2013.01); *G06F 2221/2101* (2013.01)

(58) Field of Classification Search
CPC ..... H04L 67/1097; H04L 67/18; H04L 67/32; H04L 69/28; G06F 17/30082; G06F 21/6272; G06F 2221/2101
USPC .......................................... 709/219
See application file for complete search history.

(56) References Cited

U.S. PATENT DOCUMENTS

| | | | |
|---|---|---|---|
| 6,389,464 B1 * | 5/2002 | Krishnamurthy ... | H04L 41/0213 709/220 |
| 6,691,116 B1 | 2/2004 | Bart | |
| 7,024,481 B2 * | 4/2006 | Kaniyar ................. | H04L 69/28 709/227 |
| 7,540,011 B2 * | 5/2009 | Wixson .............. | H04N 7/17318 348/590 |
| 8,013,738 B2 | 9/2011 | Donavan et al. | |
| 8,180,735 B2 * | 5/2012 | Ansari .................. | G06Q 30/04 380/255 |

(Continued)

FOREIGN PATENT DOCUMENTS

CN    102387347    3/2012

OTHER PUBLICATIONS

Machine Translation of CN-102387347 (He) in IDS, 2012.*

(Continued)

*Primary Examiner* — Melvin H Pollack
(74) *Attorney, Agent, or Firm* — Fabian Vancott

(57) ABSTRACT

Storing data at a remote location based on predetermined criteria includes obtaining data from a remote sensor, identifying a storage provider that meets predetermined storage criteria of the data, and uploading the data to the storage provider.

20 Claims, 4 Drawing Sheets

(56) References Cited

U.S. PATENT DOCUMENTS

| | | | |
|---|---|---|---|
| 8,350,907 B1 | 1/2013 | Blanco et al. | |
| 8,392,553 B2* | 3/2013 | Petropoulakis | G06F 11/3006 |
| | | | 709/224 |
| 8,990,585 B2* | 3/2015 | Grube | G06F 11/1076 |
| | | | 707/687 |
| 9,116,788 B2* | 8/2015 | Driever | G06F 13/12 |
| 9,332,051 B2* | 5/2016 | Brueck | H04L 65/607 |
| 9,369,526 B2* | 6/2016 | Resch | H04L 67/1097 |
| 9,454,431 B2* | 9/2016 | Grube | G06F 17/30194 |
| 9,614,628 B2* | 4/2017 | Seppala | H04H 60/50 |
| 2006/0279643 A1 | 12/2006 | Levien et al. | |
| 2006/0294215 A1 | 12/2006 | Noble et al. | |
| 2008/0106597 A1 | 5/2008 | Amini et al. | |
| 2008/0297599 A1 | 12/2008 | Donovan et al. | |
| 2009/0079823 A1 | 3/2009 | Bellamy et al. | |
| 2009/0313363 A1* | 12/2009 | Parsons | H04L 67/1097 |
| | | | 709/223 |
| 2011/0072037 A1* | 3/2011 | Lotzer | G06F 17/30855 |
| | | | 707/769 |
| 2012/0166576 A1 | 6/2012 | Orsini et al. | |
| 2013/0144984 A1* | 6/2013 | Zhao | H04L 65/608 |
| | | | 709/219 |
| 2014/0136511 A1* | 5/2014 | Hughes | G06F 17/30498 |
| | | | 707/714 |
| 2014/0325224 A1* | 10/2014 | Grube | G06F 17/30194 |
| | | | 713/168 |
| 2017/0147657 A1* | 5/2017 | Bhave | G06F 17/30551 |
| 2017/0149628 A1* | 5/2017 | Aggarwal | H04L 41/5032 |
| 2017/0315731 A1* | 11/2017 | Driever | G06F 12/0646 |
| 2017/0325006 A1* | 11/2017 | Marcus | H04N 21/854 |

OTHER PUBLICATIONS

Extended European Search Report, EP Application No. 13895643.8, dated Mar. 24, 2017, pp. 1-15, EPO.

Oliver Dohndorf et al., "Adaptive and Reliable Binding in Ambient Service Systems," 2011 IEEE 16th Conference on Emerging Technologies & Factory Automation (ETFA), Sep. 5, 2011, pp. 1-8, IEEE.

CameraFTP, "A Revolutionary Security & Monitoring Service", 2013, 3 pages.

International Searching Authority, "Notification of Transmittal of the International Search Report and the Written Opinion", PCT/US2013/065434, dated Jul. 9, 2014 16 pages.

ITQuotes, "Remote Data Storage Service", Data Back Up Service, Oct. 2, 2013, 3 pages.

O'Donnell, A., "How to Backup Your IP Security Cameras to the Cloud", About.com Internet/Network Security, Oct. 2, 2013, 1 page.

Zbikowski, D., "Ensure Data Security With Online Backup", Toast Net Internet Service White Paper: Data Backup, Mar. 11, 2011, 4 pages.

* cited by examiner

STORING DATA AT A REMOTE LOCATION BASED ON PREDETERMINED CRITERIA

CROSS-REFERENCE TO RELATED APPLICATION

This application is a U.S. National Stage Application of and claims priority to international Patent Application No. PCT/US2013/065434, filed on Oct. 17, 2013, and entitled "STORING DATA AT A REMOTE LOCATION BASED ON PREDETERMINED CRITERIA," the entire content of which is hereby incorporated in its entirety.

BACKGROUND

Environmental monitoring systems, such as security cameras, often use on site data storage. As data and/or time slices are obtained, the data is directed to the on site storage. A user can retrieve the data on site and view the data as desired.

BRIEF DESCRIPTION OF THE DRAWINGS

The accompanying drawings illustrate various examples of the principles described herein and are a part of the specification. The illustrated examples are merely examples and do not limit the scope of the claims.

DETAILED DESCRIPTION

Storing the data on site poses the risk that the data can be lost or stolen. For example, a criminal who burglarizes a convenient store after hours may take the storage data with him. Further, extreme weather, such a hurricanes and tornados, may destroy data located on site. Also, the storage capacity on site may be limited such that the just some of the data that is desired to be collected can be stored locally before the available storage space is exhausted.

The principles described herein include a method that allows an unlimited amount of data to be stored in a safe, secure environment. Such a method can include obtaining data from a remote sensor, identifying a storage provider that meets predetermined storage criteria of the data, and uploading the data to the storage provider.

In the following description, for purposes of explanation, numerous specific details are set forth in order to provide a thorough understanding of the present systems and methods. It will be apparent, however, to one skilled in the art that the present apparatus, systems, and methods may be practiced without these specific details. Reference in the specification to "an example" or similar language means that a particular feature, structure, or characteristic described is included in at least that one example, but not necessarily in other examples.

Figures 1, 2:
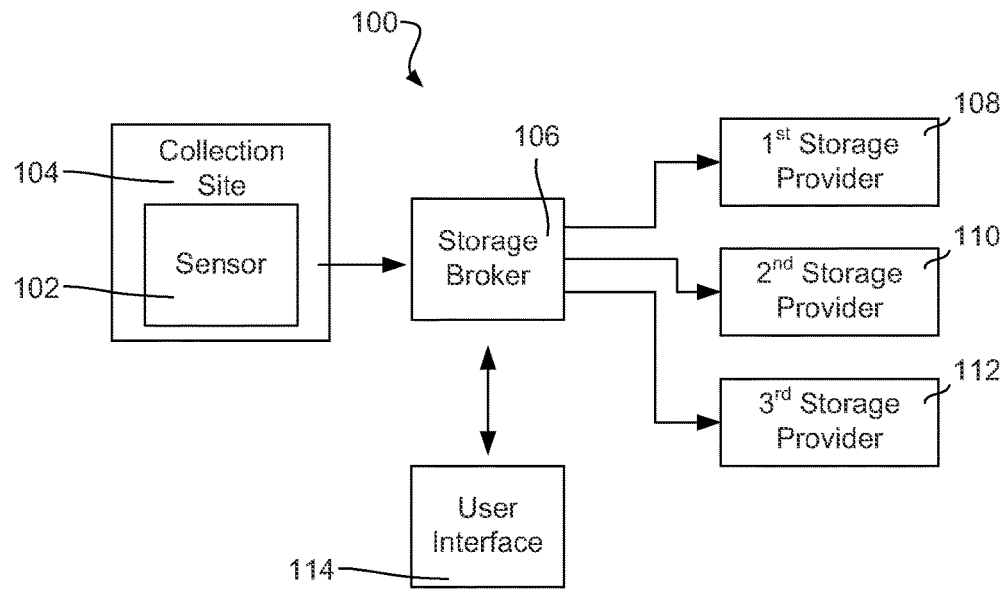
FIG. 1 is a diagram of an example of a storing system according to the principles described herein.
FIG. 2 is a diagram of an example of a maintenance table according to the principles described herein.

FIG. 1 is a diagram of an example of a storing system (100) according to the principles described herein. In this example, a sensor (102) is located at a collection site (104). The sensor (102) is in communication with a storage broker (106). The storage broker (108) is in communication with multiple storage providers (108, 110, 112). The storage broker (108) is also in communication with a user interface (114) that allows the user to retrieve and view the collected data.

The principles described herein may incorporate any appropriate type of sensor. In some examples, the sensor (102) is a video camera that captures visual data. Such a video camera may be positioned in a bank, a convenient store, a gas station, another location, or combinations thereof for security purposes. In other examples, a video camera may be used for non-security purposes, such as monitoring weather, traffic, scientific observations, other purposes, or combinations thereof. In yet other examples, the sensor may be a thermometer, a pressure sensor, a weather sensor, an electrical sensor, an electrical resistivity sensor, a digital sensor, an analog sensor, a nuclear sensor, a porosity sensor, a level sensor, a health monitoring sensor, a magnetic sensor, another type of sensor, or combinations thereof. In some examples, the collection site (104) is a fixed location. In other examples, the collection site (104) is a mobile site. For example, the sensor (102) may be incorporated in a cell phone or be part of a health monitoring package that is used to monitor the condition of a mobile patient.

The storage broker (106) may be a combination of hardware and program instructions to provide brokering services. The storage broker (106) may be located on site with the sensor (102), or the storage broker (106) may be located at a remote location. In some examples, the storage broker (106) communicates with the sensor (102) wirelessly, through a cable, over the internet, through a satellite, with another communication mechanism, or combinations thereof. In some examples, the sensor (102) sends the data to the storage broker (106) and temporarily stores the data while the storage broker (106) determines where to send the data for longer term storage. In some examples, the sensor (102) communicates with the storage broker (106) to determine where the data should be stored, and the storage broker (106) tells the sensor (102) where to send the data for storage. In such examples, the sensor (102) may send metadata or other types of information that describe the data to be stored. Such a description may include storage criteria, such as the accessibility desired for the data, the desired retrieval speed for the data, the length of a time slice of data, the desired reliability of the storage provider, the insurance of the storage provider, the security level of the storage provider, the budget for the data, other storage criteria, or combinations thereof.

The storage broker (106) may weigh each of the predetermined criteria about the data, and compare those criteria to the storage providers (108, 110, 112) available for storage. For example, if a time slice of data is determined to be highly valuable and will likely to be accessed many times, the storage broker may select a more expensive storage provider on which to store the highly valuable data than for a different time slice of data that is less valuable and less likely to be accessed. Further, the storage price of the storage providers (108, 110, 112) may fluctuate day to day. Thus, a storage provider that did not meet the storage criteria of a time slice of data at one moment may meet the storage criteria of that time slice at a later moment. The storage broker (106) may track all of the changes to the storage providers (108, 110, 112) to optimize the storage of the data.

The data may be sent to the storage broker (106) or directly to the selected storage provider in batch installments or in real time. In some examples, data from the sensor is sent to the storage broker on a periodic basis, and the value and/or storage criteria are predetermined. Such an example may include a security camera that consistently records data during certain times and the storage needs of such data are predictable. In examples where the value and/or storage criteria of a time slice of data is established before the time slice is recorded by the sensor (102), the storage broker (106) may determine where to store the data before the data or its related information is sent to the storage broker (106). In such an example, the storage provider (106) may wait until a time that is closer to when the data is ready for storage before deciding where to store the data to take advantage of last minute price changes.

The storage broker (106) may have a pre-negotiated relationship with one or multiple storage providers to get a bulk rate. Further, the storage broker (106) may solicit bids from the storage providers to get as low of a price on storage as possible for the end user. Such a bid system may work well for data that that is recorded on a predictable basis, such as with security cameras.

In some examples, the data is encrypted before it is sent to the storage broker (106) or to the selected storage provider. Any appropriate type of transfer protocol may be used in accordance with the principles described herein. For example, the communications between the sensor (102) and the storage broker (106) or storage provider may follow a secure socket layer protocol.

The storage broker (106) may be authorized by the sensor (102) to enter into a contract with the storage providers on behalf of the sensor (102). An account for each sensor may be established to avail the sensors of the services of the storage broker (106).

The storage broker (106) may determine where to send each time slice of data based on a matrix of multiple factors. The matrix may include cost, reliability, retrieval speed, and other factors. Each time slice, even time slices from the same sensor, may have different values or criteria. For example, if a particular store is historically burglarized just between 1:00 a.m. and 3:30 a.m., a time slice of data from a security camera that covers that time slice may be assigned a higher value and other types of storage criteria than other time slices from the same sensor but taken at different times of the day. Further, with the fluctuating storage prices of the storage providers, the time slices from a single sensor may be assigned to multiple storage providers. Such an arrangement may be more economically efficient for the end user.

To track the multiple storage providers on which the data is stored, the storage broker (106) may maintain a maintenance table that associates the sensor, the time slice of data, and the location of the data. In this manner, the user can retrieve the data by requesting to view the data from the user interface (114). The storage broker (106) may retrieve the requested data for the user by displaying the data in a monitor. The requested data may include multiple time slices that are stored in different storage providers. A playing engine may consult with the maintenance table maintained by the storage provider (106) and retrieve the appropriate time slices such that the user can view the data in the sequential order without being aware that the different time slices are being retrieved from different sites.

In some examples, the user interface (114) may be in remote communication with the storage provider (106). Thus, a user may be able to view the data from any appropriate location. For example, the user may view the data from a home computer, a mobile device, a public library, a school, another location, another device, or combinations thereof.

Thus, in accordance with the principles described herein, the data can have an unlimited storage space by interfacing with multiple storage broker (106). Also, the data is stored off site; thus, theft or disasters at the collection site will not harm the data that has already been stored. Also, by allowing the storage broker (106) to select between competing storage providers based on the predetermined storage criteria and the characteristics of the available storage providers, the total cost to the end user may be cheaper than storing all of the data in a single location.

The storage broker (106) may be used to store all of the data from a sensor (102) or just a portion of the data. In cases where just a portion of the data is stored through the services of the storage broker (106), some of the less valuable data may be stored locally where the more valuable data is stored remotely with the assistance of the storage broker (106).

FIG. 2 is a diagram of an example of a maintenance table (200) according to the principles described herein. In this example, the maintenance table (200) includes a sensor identifier column (202), a time slice identifier column (204), a time slice start column (206), a time slice end column (208), and a location column (210).

In this example, each of the sensors is identified with an identifier. Such a sensor identifier can assist a user when seeking to retrieve the time slices for a particular sensor. For example, the user may look up all the time slices within a particular time period by the sensor. Further, the sensor identifier helps the displaying engine to retrieve the appropriate time slice from the appropriate sensor.

Likewise, each time slice is also identified with another identifier. Such an identifier further helps to keep the time slices organized and retrieved correctly. The maintenance table (200) also tracks the start time and the end time of each of the time slices. This allows the playing engine to determine the correct sequential order of the time slices for each sensor.

The location column (210) identifies the location or provides a mechanism to find the location of the stored time slices. In some examples, the location column (210) identifies the uniform resource locator (URL) of the time slice's location. The location column (210) may also provide a link to the location, provide a symbol that represents the location, provide another mechanism that assists the playing engine to find the location, or combinations thereof.

In this example, the time slice identified with identifier 045 is stored in a different location than the other time slices that immediately precede and immediately follow time slice 045. This time slice may include a time period that has been determined to have a different value than the other time slices, and is therefore assigned to a different location that reflects that value. In some examples, time slice 045 may have a similar value as the other time slices, but time slice 045 may have a different characteristic, such as a faster retrieval time criteria than the other time slices. In other examples, the other time slices may have the same or a similar predetermined value as the time slice 045, but at the time that time slice 045 was ready to be stored, another storage provider offered a lower price than when the other time slices were ready to be uploaded for storage.

Figure 3:
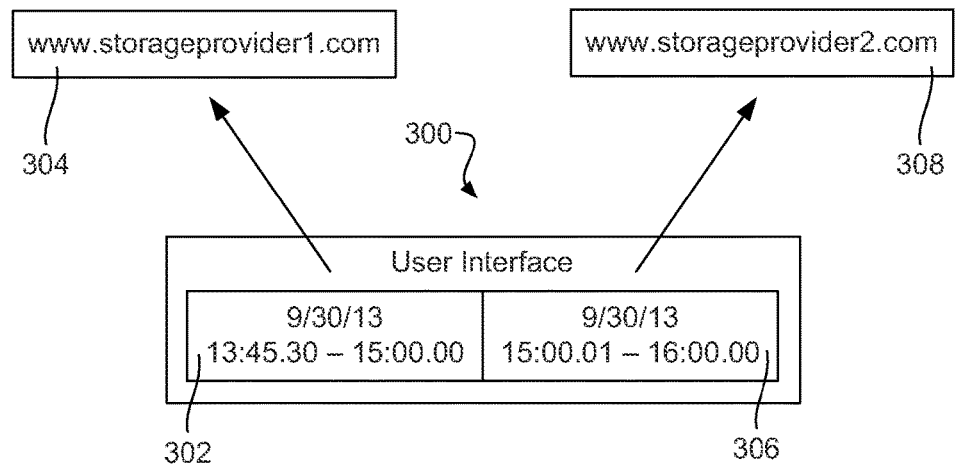
FIG. 3 is a diagram of an example of a user interface according to the principles described herein.

FIG. 3 is a diagram of an example of a user interface (300) according to the principles described herein. In this example, the user interface (300) is playing time slices. The first time slice (302) is pulled from a first location (304), and the second time slice (306) is pulled from a second location (308). The first and second time slices (302, 306) are sequential such that the end of the first time slice (302) is immediately followed by the start of the second time slice (306). The user interface (300) plays these time slices by retrieving the time slices (302, 306) from their different locations in such a manner that is transparent to the user. For example, the user may request to view a series of data from 14:00.00 to 15:30.00. The user interface (300) may play this time segment, which overlaps the transition between the first and second time slices (302, 306), such that the user is unaware that the time segment includes data from multiple locations.

Figure 4:
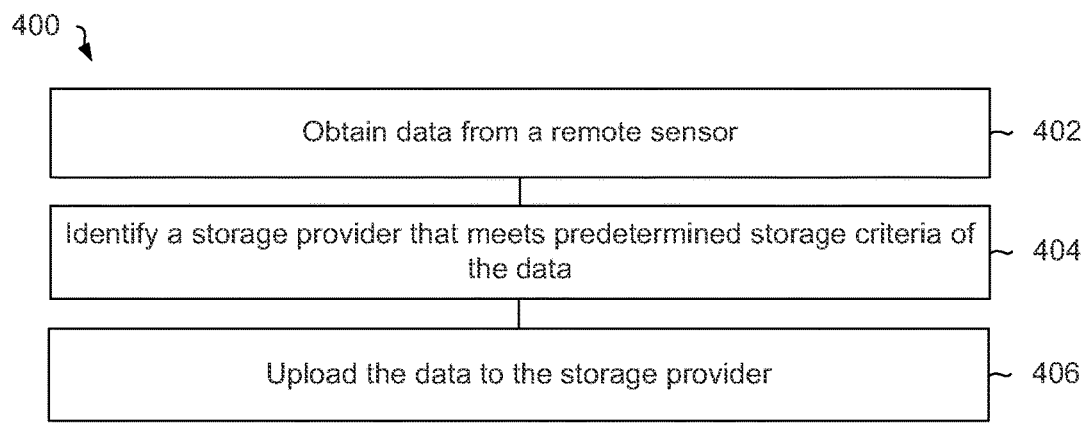
FIG. 4 is a diagram of an example of a method for storing data at a remote location based on predetermined criteria according to the principles described herein.

FIG. 4 is a diagram of an example of a method (400) for storing data at a remote location based on predetermined criteria according to the principles described herein. In this example, the method (400) includes obtaining (402) data from a remote sensor, identifying (404) a storage provider that meets predetermined storage criteria of the data, and uploading (406) the data to the storage provider.

The storage criteria may be based on a determined value of a time slice of the data, on a duration of the time slices to be stored, on a price of the storage provider, on a reliability of the storage provider, on a retrieval speed of the storage provider, another storage criteria, or combinations thereof. In some examples, the data has a budget, and the method includes selecting an identified storage provider that is the least expensive of the storage providers that still meets the storage criteria.

Multiple time slices of data may be uploaded to different storage providers based on different characteristics of the time slices. To track the location of each of the time slices, a table may be maintained of a location of each time slice. By referring to the table, a playing engine may play back the data from the storage provider by retrieving the time slices from the appropriate locations in response to a user request. In some examples, the playing engine plays back the data from the storage provider by playing a first time slice of the data stored in a first location followed by playing a second time slice of the data stored in second location that is different than the first location automatically if the second time slice sequentially follows the first time slice based on the start and end time stamps.

A system to implement such a method may include a data sensor. Such a data sensor may be, but is not limited to a security camera or temperature monitoring device. The system may also include a user interface system and storage providers. The sensors can be located at the site of collection, which may be a home or a business. The user interface can be located at an unspecified location that is addressable over a network. The storage system can be located at an unspecified location such that it is accessible to the user interface. The sensors may send collected data over a secure network connection to a storage broker and cause the storage broker to persist the collected data to selected storage providers. Consumers of the collected data may communicate with the storage system through the user interface over a secure network connection. The user interface may allow secure retrieval of recorded collected data by humans or automated systems.

Such a system has multiple advantages. The collected data is not subject to theft or damage at the collection site. Also, the collected data may be retrieved from any physical location that can connect to the user interface. Further, there is no theoretical limit on size of collected data as cloud based systems can automatically allocate additional storage space as it is desired.

Figure 5:
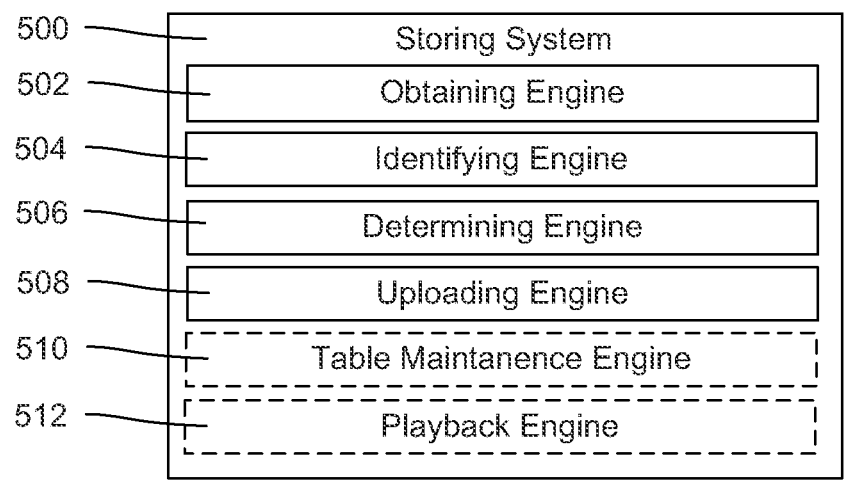
FIG. 5 is a diagram of an example of a storing system according to the principles described herein.

FIG. 5 is a diagram of an example of a storing system (500) according to the principles described herein. In this example, the storing system (500) includes an obtaining engine (502), an identifying engine (504), a determining engine (506), and an uploading engine (506). In this example, the storing system (500) also includes a table maintenance engine (510) and a playback engine (512). The engines (502, 504, 506, 508, 510, 512) refer to a combination of hardware and program instructions to perform a designated function. Each of the engines (502, 504, 506, 508, 510, 512) may include a processor and memory. The program instructions are stored in the memory and cause the processor to execute the designated function of the engine.

The obtaining engine (502) obtains data from the environment through sensors. The data can be sent to an identifying engine (504) along with data that describes the storage criteria of the data. The identifying engine (504) identifies those storage providers that meet the storage criteria for each time slice of data.

The determining engine (506) determines based on the storage criteria and the identified storage providers where to store the data. If the identifying engine (504) identifies that a single storage provider meets each of the storage criteria for a particular time slice, then the determining engine (506) will determine that the time slice will be stored in that storage provider. On the other hand, if the identifying engine (504) determines that multiple storage providers meet the storage criteria of a particular time slice, than the determining engine (506) will choose between the identified storage providers. In some examples, the determining engine (506) may select one of the storage providers based on the least expensive option. In other examples, the determining engine (506) may weigh another storage criterion higher than other storage criteria and select between the identified storage providers based on the highest weighted storage criterion. In response to determining where to store the time slice, the uploading engine (508) may upload the data to the selected storage provider.

The table maintenance engine (510) may maintain a table that identifies which time slices are stored at which storage provider. In some examples, the table includes a direct address or link to the storage location within the storage provider. The table may track identifiers for the time slice and corresponding sensor. In some examples, the table tracks the start and stop times of the time slices. While the above examples have been described with reference to specific types of data that are included in the maintenance table, any appropriate type of data may be included in accordance with the principles described herein.

The playback engine (512) may play the time slices of data through a user interface in response to a user request. The playback engine (512) may retrieve the time slices of data from any appropriate location. In some examples, sequential time slices are from different storage providers and/or locations. Thus, the playback engine (512) plays time slices sequentially from multiple locations. In such examples, the playback engine (512) may play the time slices in such a manner that the user is unaware that the time slices are coming from different locations. For example, the user may request to play a time segment of data that spans multiple time slices that are stored in different locations. The playback engine (512) may present the entire time segment to the user in a format that displays a single time slider that represents the entire time segment, which includes at least portions of different time slices from different locations. As the slider progresses past a transition in time slices within the overall time segment, the slider may continue seamlessly without pausing. Further, as a time slice ends and another time slice begins, the playback engine (512) may continue between the two time slices without a pause as well. Under such circumstances, the user may not be aware that the time slices are coming from different locations.

In some examples, the user will not have access to the maintenance table. Thus, the user will be unaware of the actual locations of the time slices or where the divisions in the time slices occur. In other examples, the user may have access to the maintenance table based on permissions or other credentials.

Figure 6:
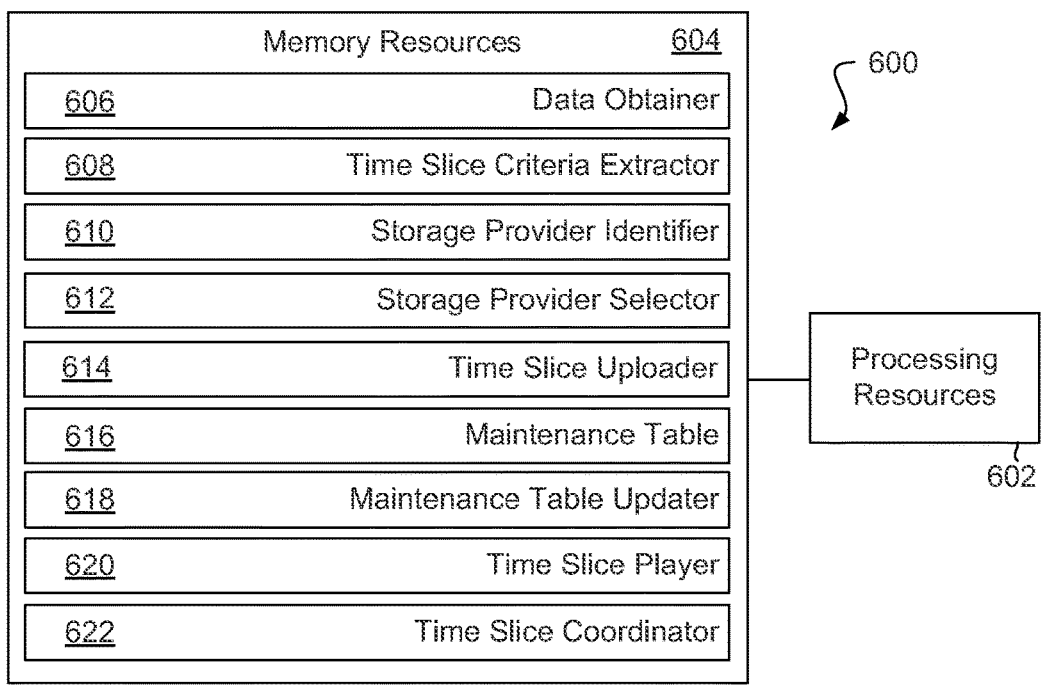
FIG. 6 is a diagram of an example of a storing system according to the principles described herein.

FIG. 6 is a diagram of an example of a storing system (600) according to the principles described herein. In this example, the storing system (600) includes processing resources (602) that are in communication with memory resources (604). Processing resources (602) include at least one processor and other resources used to process programmed instructions. The memory resources (604) represent generally any memory capable of storing data such as programmed instructions or data structures used by the storing system (600). The programmed instructions shown stored in the memory resources (604) include a data obtainer (606), a time slice criteria extractor (608), a storage identifier (610), a storage selector (612), a time slice uploader (614), a maintenance table updater (618), a time slice player (620), and a time slice coordinator (622). The data structures shown stored in the memory resources (604) include a maintenance table (616).

The memory resources (604) include a computer readable storage medium that contains computer readable program code to cause tasks to be executed by the processing resources (602). The computer readable storage medium may be tangible and/or non-transitory storage medium. The computer readable storage medium may be any appropriate storage medium that is not a transmission storage medium. A non-exhaustive list of computer readable storage medium types includes non-volatile memory, volatile memory, random access memory, memristor based memory, write only memory, flash memory, electrically erasable program read only memory, magnetic storage media, other types of memory, or combinations thereof.

The data obtainer (606) represents programmed instructions that, when executed, cause the processing resources (602) to obtain data from sensors. The time slice criteria extractor (608) represents programmed instructions that, when executed, cause the processing resources (602) to extract storage criteria associated with a time slice of data obtained by the data obtainer (606). The storage provider identifier (610) represents programmed instructions that, when executed, cause the processing resources (602) to identify storage providers that meet the storage criteria. The storage provider selector (612) represents programmed instructions that, when executed, cause the processing resources (602) to select one of the identified storage providers for storing a particular time slice of data. The storage provider selector (612) may follow a selection policy that weighs different storage criteria differently. Such a selection policy may be established based on user input, be a default policy, or be part of a learning model. The time slice uploader (614) represents programmed instructions that, when executed, cause the processing resources (602) to upload the time slice in response to the selection of a storage provider.

The maintenance table updater (618) represents programmed instructions that, when executed, cause the processing resources (602) to update the maintenance table (616), which tracks the locations of each of the time slices uploaded to a storage provider. The time slice player (620) represents programmed instructions that, when executed, cause the processing resources (602) to play the time slice through a user interface in response to a user request. The time slice coordinator (622) represents programmed instructions that, when executed, cause the processing resources (602) to coordinate the time slices such that the time slice player (620) can play time slices from different locations in such a manner that the user is unaware that the time slices are coming from different sources.

Further, the memory resources (604) may be part of an installation package. In response to installing the installation package, the programmed instructions of the memory resources (604) may be downloaded from the installation package's source, such as a portable medium, a server, a remote network location, another location, or combinations thereof. Portable memory media that are compatible with the principles described herein include DVDs, CDs, flash memory, portable disks, magnetic disks, optical disks, other forms of portable memory, or combinations thereof. In other examples, the program instructions are already installed. Here, the memory resources can include integrated memory such as a hard drive, a solid state hard drive, or the like.

In some examples, the processing resources (602) and the memory resources (604) are located within the same physical component, such as a server, or a network component. The memory resources (604) may be part of the physical component's main memory, caches, registers, nonvolatile memory, or elsewhere in the physical component's memory hierarchy. Alternatively, the memory resources (604) may be in communication with the processing resources (602) over a network. Further, the data structures, such as the libraries and may be accessed from a remote location over a network connection while the programmed instructions are located locally. Thus, the storing system (600) may be implemented on a user device, on a server, on a collection of servers, or combinations thereof.

The storing system (600) of FIG. 6 may be part of a general purpose computer. However, in alternative examples, the storing system (600) is part of an application specific integrated circuit.

The preceding description has been presented only to illustrate and describe examples of the principles described. This description is not intended to be exhaustive or to limit these principles to any precise form disclosed. Many modifications and variations are possible in light of the above teaching.

What is claimed is:

1. A non-transitory computer readable medium comprising instructions that, when executed, cause a processor to:
obtain data from a remote sensor;
identify a storage provider that meets predetermined storage criteria for a characteristic of a time slice of said data; and
upload said time slice of said data to said storage provider that meets predetermined storage criteria.

2. The non-transitory computer readable medium of claim 1, further comprising instructions to cause said processor to identify said storage provider based on the characteristic being a determined value of said time slice of said data.

3. The non-transitory computer readable medium of claim 1, further comprising instructions to cause said processor to identify said storage provider based on the characteristic being a duration of said time slice of said data.

4. The non-transitory computer readable medium of claim 1, further comprising instructions to cause said processor to identify said storage provider based on a price of said storage provider.

5. The non-transitory computer readable medium of claim 1, further comprising instructions to cause said processor to identify said storage provider based on a reliability of said storage provider.

6. The non-transitory computer readable medium of claim 1, further comprising instructions to cause said processor to identify said storage provider based on a retrieval speed of said storage provider.

7. The non-transitory computer readable medium of claim 1, further comprising instructions to cause said processor to identify different storage providers for multiple time slices of said data based on different characteristics of said multiple time slices.

8. The non-transitory computer readable medium of claim 1, further comprising instructions to cause said processor to maintain a table of a location of time slices of said data.

9. The non-transitory computer readable medium of claim 1, further comprising instructions to cause said processor to play back said data from said storage provider.

10. The non-transitory computer readable medium of claim 1, further comprising instructions to cause said processor to play back said data from said storage provider by playing a first time slice of said data stored in a first location followed by playing a second time slice of said data stored in second location that is different than said first location automatically if said second time slice sequentially follows said first time slice based on time stamps.

11. A system for storing data at a remote location based on predetermined criteria, comprising:
  a processor; and
  a non-transitory computer readable medium storing instructions that, when executed by the processor, cause said processor to:
    obtain data from a remote sensor;
    identify storage providers that meet predetermined storage criteria for a characteristic of a time slice of said data;
    determine a storage provider of said storage providers to store said time slice of said data; and
    upload said time slice to said storage provider.

12. The system of claim 11, wherein said non-transitory computer readable medium stores instructions to maintain a table that tracks with which storage providers time slices of said data are stored.

13. The system of claim 11, wherein said non-transitory computer readable medium stores instructions to play back time slices of said data.

14. The system of claim 13, wherein said instructions to play back time slices of said data, when executed, cause said processor to play a first time slice of said data stored in a first location followed by playing a second time slice of said data stored in second location that is different than said first location automatically if said second time slice sequentially follows said first time slice based on time stamps.

15. A method comprising:
  obtaining, by a hardware-based storage broker, data from a remote sensor;
  identifying, by said storage broker, storage providers that meet predetermined storage criteria for a characteristic of a time slice of said data;
  determining, by said storage broker, a storage provider of said storage providers to store said time slice of said data;
  uploading, by said storage broker, said time slice to said storage provider; and
  maintaining, by said storage broker, a table that tracks with which storage providers time slices of said data are stored.

16. The method of claim 15, further comprising playing back time slices of said data stored at different storage providers in sequential order.

17. The non-transitory computer readable medium of claim 1, wherein said instructions that cause said processor to identify a storage provider that meets predetermined storage criteria of a time slice of said data includes instructions to:
  identify multiple storage providers that meet predetermined storage criteria, and
  determine said storage provider from said multiple storage providers.

18. The non-transitory computer readable medium of claim 17, wherein said predetermined storage criteria are weighted, and
  said instructions to determine said storage provider includes instructions to select from said multiple storage providers based on a highest weighted storage criterion.

19. The non-transitory computer readable medium of claim 2, wherein said instructions to identify said storage provider identify an expensive storage provider from multiple storage providers for said time slice having a high determined value.

20. The non-transitory computer readable medium of claim 7, wherein at least some time slices of said multiple time slices have different durations.

* * * * *